Dec. 31, 1935.  E. G. ROEHM  2,025,902
MILLING MACHINE TRANSMISSION AND CONTROL MECHANISM
Filed March 3, 1934  11 Sheets-Sheet 1

Inventor
ERWIN G. ROEHM
By A. K. Parsons
Attorney

Dec. 31, 1935.  E. G. ROEHM  2,025,902
MILLING MACHINE TRANSMISSION AND CONTROL MECHANISM
Filed March 3, 1934  11 Sheets-Sheet 2

Inventor
ERWIN G. ROEHM
By A. K. Parsons
Attorney

Dec. 31, 1935.  E. G. ROEHM  2,025,902
MILLING MACHINE TRANSMISSION AND CONTROL MECHANISM
Filed March 3, 1934  11 Sheets-Sheet 3

Inventor
ERWIN G. ROEHM
By AHK Parsons
Attorney

Dec. 31, 1935.  E. G. ROEHM  2,025,902
MILLING MACHINE TRANSMISSION AND CONTROL MECHANISM
Filed March 3, 1934  11 Sheets-Sheet 4

Inventor
ERWIN G. ROEHM
By
HK Parsons
Attorney

Dec. 31, 1935.  E. G. ROEHM  2,025,902

MILLING MACHINE TRANSMISSION AND CONTROL MECHANISM

Filed March 3, 1934  11 Sheets-Sheet 5

Inventor
ERWIN G. ROEHM

By  A. K. Parsons
Attorney

Dec. 31, 1935. E. G. ROEHM 2,025,902
MILLING MACHINE TRANSMISSION AND CONTROL MECHANISM
Filed March 3, 1934  11 Sheets-Sheet 6

Inventor
ERWIN G. ROEHM
By A. K. Parsons
Attorney

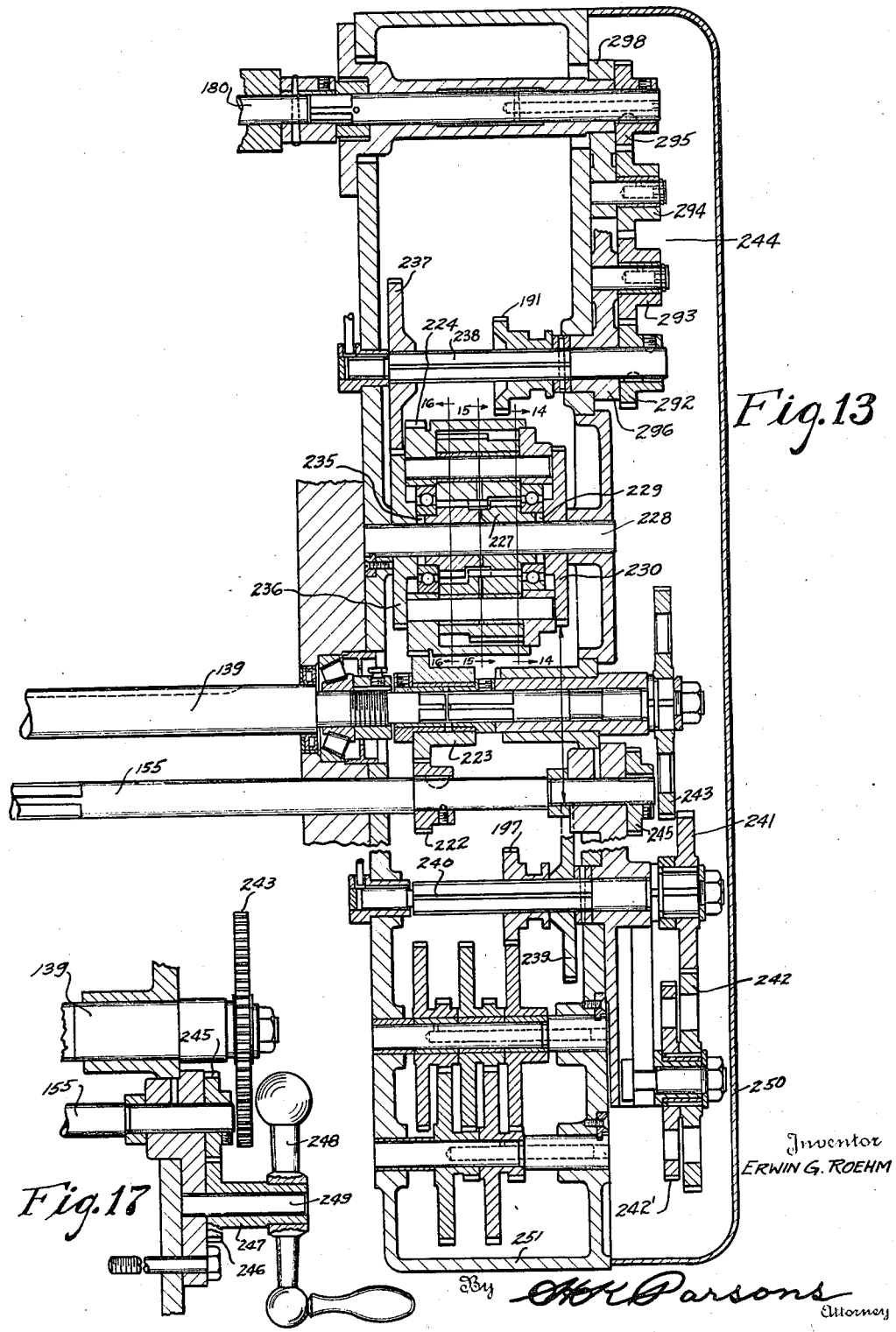

Dec. 31, 1935.   E. G. ROEHM   2,025,902
MILLING MACHINE TRANSMISSION AND CONTROL MECHANISM
Filed March 3, 1934   11 Sheets-Sheet 8
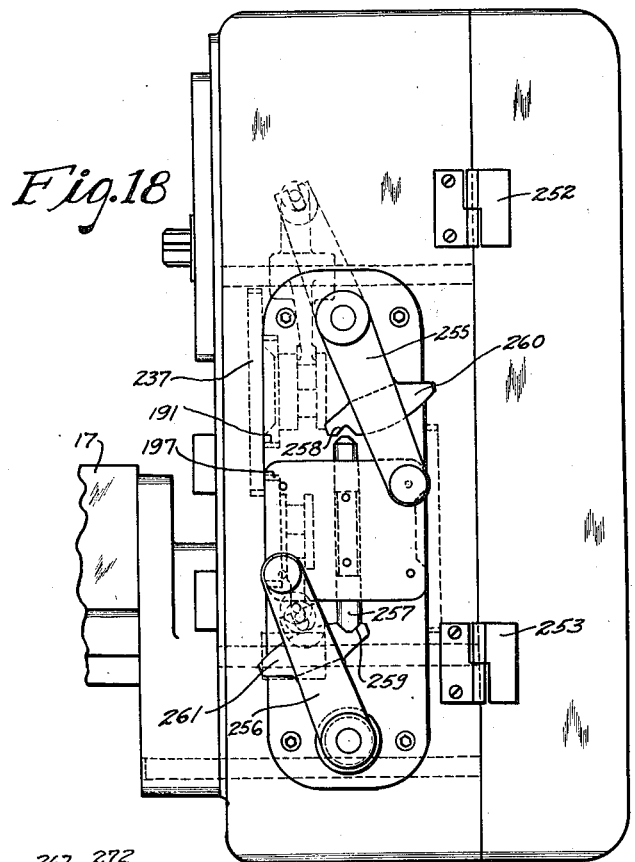
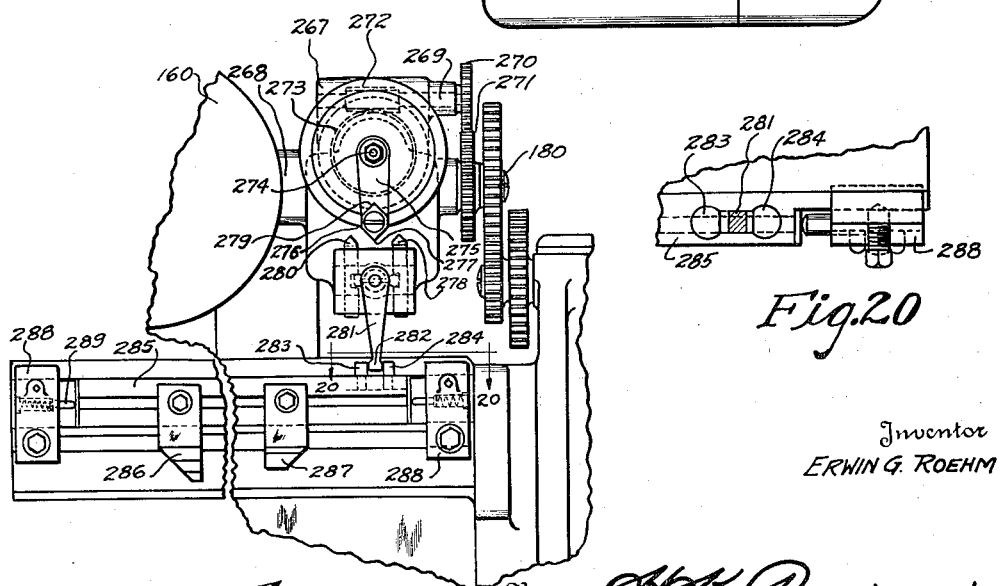
Inventor
ERWIN G. ROEHM

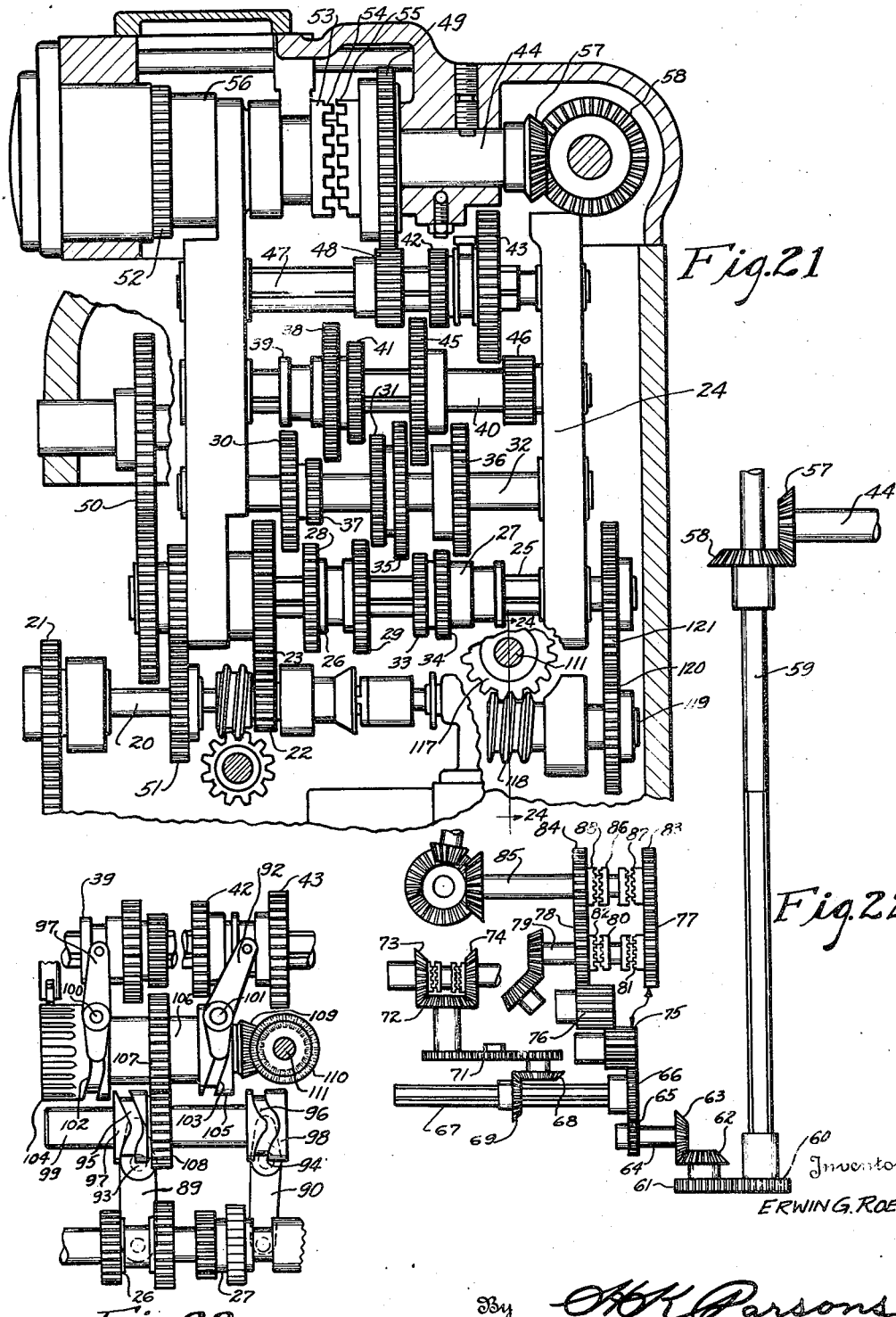
Dec. 31, 1935.  E. G. ROEHM  2,025,902
MILLING MACHINE TRANSMISSION AND CONTROL MECHANISM
Filed March 3, 1934  11 Sheets-Sheet 9
Inventor
ERWIN G. ROEHM
By A. K. Parsons
Attorney Dec. 31, 1935.　　　　E. G. ROEHM　　　　2,025,902
MILLING MACHINE TRANSMISSION AND CONTROL MECHANISM
Filed March 3, 1934　　11 Sheets-Sheet 10

Inventor
ERWIN G. ROEHM
By AHK Parsons
Attorney

Dec. 31, 1935.  E. G. ROEHM  2,025,902
MILLING MACHINE TRANSMISSION AND CONTROL MECHANISM
Filed March 3, 1934  11 Sheets-Sheet 11

Inventor
ERWIN G. ROEHM
By AHKParsons
Attorney

Patented Dec. 31, 1935

2,025,902

UNITED STATES PATENT OFFICE 2,025,902

MILLING MACHINE TRANSMISSION AND CONTROL MECHANISM

Erwin G. Roehm, Norwood, Ohio, assignor to The Cincinnati Milling Machine Company, Cincinnati, Ohio, a corporation of Ohio Application March 3, 1934, Serial No. 713,889

33 Claims. (Cl. 90—20)

This invention relates to milling machines and more particularly to a transmission and control mechanism therefor, especially utilizable when cutting spiral grooves, threads and the like.

In performing special operations on milling machines in which power driven attachments, such as spiral milling heads, are utilized for generating other than rectilinear cutting paths, it is highly desirable that these attachments be so connected for actuation by the usual table transmission as to utilize as much thereof as possible so that no change in the manner of controlling the work movement relative to the cutter will be introduced. It is also desirable that these attachments be operatively connected with this transmission for reception of power therefrom in the easiest possible manner.

In the past, difficulties have been experienced in providing a primary transmission mechanism which may be utilized in its entirety for operating either the table alone; or the table and attachment simultaneously.

It is an object of this invention to provide an improved transmission and control mechanism for the purposes set forth which is simple in construction; which is composed of a relatively few number of parts; and in which the control elements operate in the usual manner regardless of whether the table is being operated alone, or simultaneously with a power driven attachment.

Another object of this invention is to provide a single reversing mechanism coaxially of the table lead screw for controlling the direction of work movement regardless of whether the table is being driven alone; or simultaneously with an attachment carried thereby.

A further object of this invention is to provide an improved mechanism for proportionately dividing a common power in-put rate into branch out-put rates for actuation respectively of a table and an attachment, the mechanism being of such a nature that the sum of the output rates of the two branches will always be a constant.

An additional object of this invention is to improve the accuracy of tripping in spiral milling machines.

A still further object of this invention is to provide a simplified selector mechanism for coupling either the table actuator or the attachment actuator to the common reverser, and interlocking means to prevent coupling of more than one of these actuators at a time.

Another object of this invention is to provide a new and improved means for determining the true feeding rate between the cutter and work along a spiral cutting path.

A further object of this invention is to provide an improved dial mechanism in cooperation with the regular feed dial of the machine which will yield a correcting factor in accordance with the lead being cut and the diameter of the work which is applicable to the feed dial reading whereby the operator may be informed at all times of the true spiral feed rate.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims without departing from or exceeding the spirit of the invention.

Referring to the drawings in which like reference numerals indicate like or similar parts:

Figure 13 is an expanded view of the transmission mechanism shown in Figure 12.

Figure 17 is a detail view showing the application of a manual actuator to the mechanism shown in Figure 13.

Figure 18 is a view of the control mechanism as viewed from the left of Figure 12.

Figure 19 is a detail view in elevation of the mechanism for controlling the trip from the movement of the head rather than from the movement of the table.

Figure 20 is a detail section on the line 20—20 of Figure 19.

Figure 21 is an expanded view of the gearing in the feed box.

Figure 22 is a view showing the train connecting the feed box to the table.

Figure 23 is an expanded view of the power operable feed change mechanism.

Figure 1:
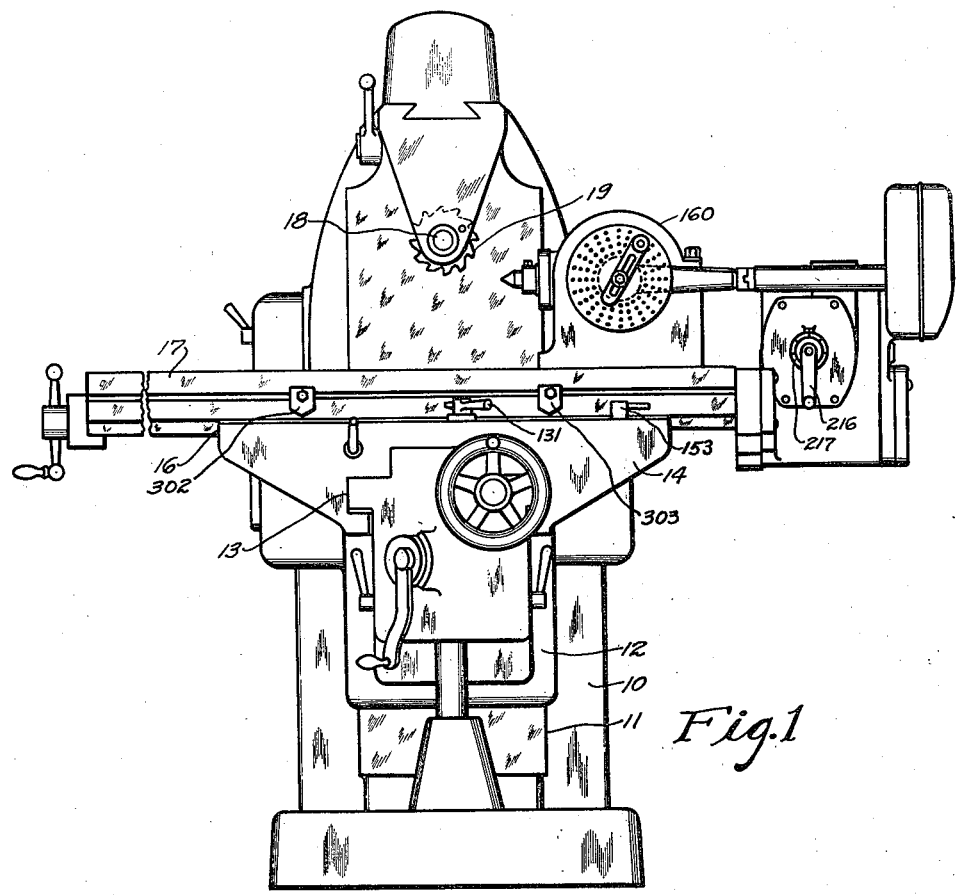
Figure 1 is a front elevation of a milling machine embodying the principles of this invention.

In the machine shown in Figure 1 the reference numeral 10 indicates the column of the machine which constitutes the main support for the cutter spindle and the work table.

The front part of the column is provided with a guideway 11 upon which is reciprocably mounted a knee member 12, having ways 13 formed on the top thereof for guiding the saddle 14 in horizontal movement toward and from the front face of the column. The saddle may be built in one piece, as shown in Figure 1 of the drawings, but preferably it is built in two parts with the upper part 14' mounted for swiveling movement about the boss 15 as is usual practice in universal type milling machines, and therefore need not be explained further here. In either case the upper portion of the saddle has horizontal guideways 16 for receiving a work table 17 which is movable horizontally, and parallel to the front face of the column. A cutter spindle 18 is rotatably mounted in the upper part of the column for rotating the tool, such as the cutter 19.

The various elements constituting the work support organization, and the cutter spindle, are all adapted to be power actuated from a suitable prime mover (not shown) carried at the rear of the machine. The transmission to the spindle may be of any suitable known type and since it does not form any part of this invention, further description thereof is not believed to be necessary. The transmission means for effecting power movement of the knee, saddle and table comprises a main shaft 20, Figure 21, having a driving gear 21 secured to the end thereof which may be connected through suitable motion transmitting means with the prime mover for continuous actuation thereby; or for selective actuation thereby. A pinion 22 secured to the shaft 20 is connected by means of gear 23 to the feed box indicated generally by the reference numeral 24.

A first spline shaft 25 is journaled in the feed box to which the gear 23 is fixed for effecting rotation of the shaft and the two slidable gear couplets 26 and 27 splined thereto. The first couplet 26 comprises gears 28 and 29 selectively shiftable into mesh with gears 30 and 31 mounted for free rotation on the shaft 32. The couplet 27 comprises gears 33 and 34 selectively shiftable into mesh with gears 35 and 36 also journaled for free rotation on the shaft 32, all of the gears on the latter shaft, however, being fixed against axial movement. The shaft 32 may be thus rotated at four different speeds. An additional gear 37 is fixed with the shaft 32 for inter-meshing with gear 38 of the slidable couplet 39 mounted on a third parallel shaft 40. This couplet has a second gear 41 adapted to be selectively meshed upon movement toward the right with gear 31 on shaft 32. By means of this last couplet the shaft 40 may be rotated at any one of eight different speeds. A set of back gears 42 and 43 are interposed between the shaft 40 and the final drive shaft 44 of the feed box and are selectively shiftable into mesh with gears 45 and 46 keyed to the shaft 40. The back gears are splined on the shaft 47 which carries a fixed pinion 48 meshing with gear 49 keyed to the final shaft 44. The back gears increase the capacity of the feed box to 16 speeds, any one of which may be selectively effected by a power shifting mechanism to be described shortly.

Means have also been provided in the feed box for effecting quick traverse movement of the various supports and this comprises a quick traverse transmission indicated generally by the reference numeral 50 and driven by the gear 51 fixed with the shaft 20. The quick traverse gear train 50 terminates in a gear 52 mounted for free rotation coaxially of the shaft 44. A feed-rapid traverse selector clutch 53 is provided with clutch teeth 54 on one face for inter-engagement with complementary clutch teeth 55 fixed with one face of the gear 49 constituting the final element of the feed transmission. Upon movement of the shifter 53 to the left it will effect inter-engagement through a friction clutch 56 with the rapid traverse gear 52 constituting the final element of the rapid traverse transmission.

Figure 4:
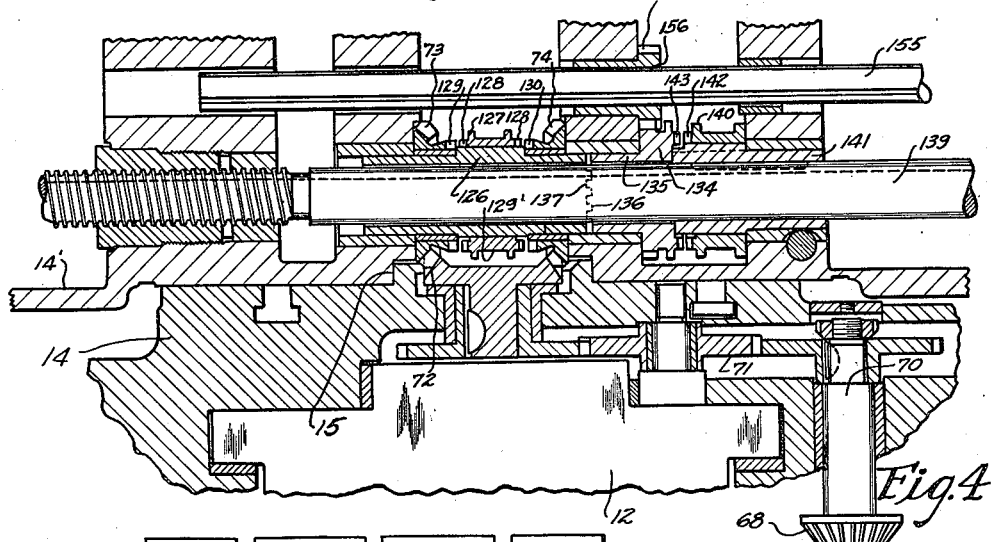
Figure 4 is a section on the line 4—4 of Figure 3.

As shown in Figures 21 and 22 the shaft 44 terminates in a bevel gear 57 inter-meshing with a bevel gear 58 fixed to a vertical spline shaft 59 mounted on the right forward side of the column for telescoping inter-engagement with a splined gear 60 carried by the knee. The gear 60 drives the gear 61, which has a bevel gear 62 fixed therewith inter-meshing with bevel gear 63 fixed to one end of a stub shaft 64. This shaft drives through gears 65 and 66, the spline shaft 67, the latter being journaled in the knee in parallel relation to the direction of saddle movement so that the bevel gear 69 carried by the saddle may be moved along the shaft upon movement of the saddle. The gear 69 meshes with 68 and as shown in Figure 4 is secured to the end of shaft 70 which, through the intermediate gear train 71, drives the bevel gear 72 and thereby rotates the bevel gears 73 and 74 in opposite directions. The portion of the train just described, beginning with the shaft 67, constitutes a branch transmission for reciprocation of the table.

The saddle and knee are driven through independent branches actuated by the gear 66, which, for this purpose, rotates gear 75 in one direction and gear 76 in an opposite direction, these two gears meshing respectively with gears 77 and 78 mounted for free rotation on the saddle drive shaft 79. This drive shaft may be inter-connected with either of these gears by an intervening clutch member 80 having teeth formed on opposite faces thereof for inter-engagement with complementary clutch teeth 81 and 82 formed on opposing faces of gears 77 and 78. The gears 77 and 78 rotate respectively the gears 83 and 84 mounted for free rotation on the knee drive shaft 85 and selectively connectible therewith by clutch member 86 having teeth formed on opposite faces thereof for engagement with clutch teeth 87 and 88 formed on the opposing faces of the respective gears.

Figures 24, 25:
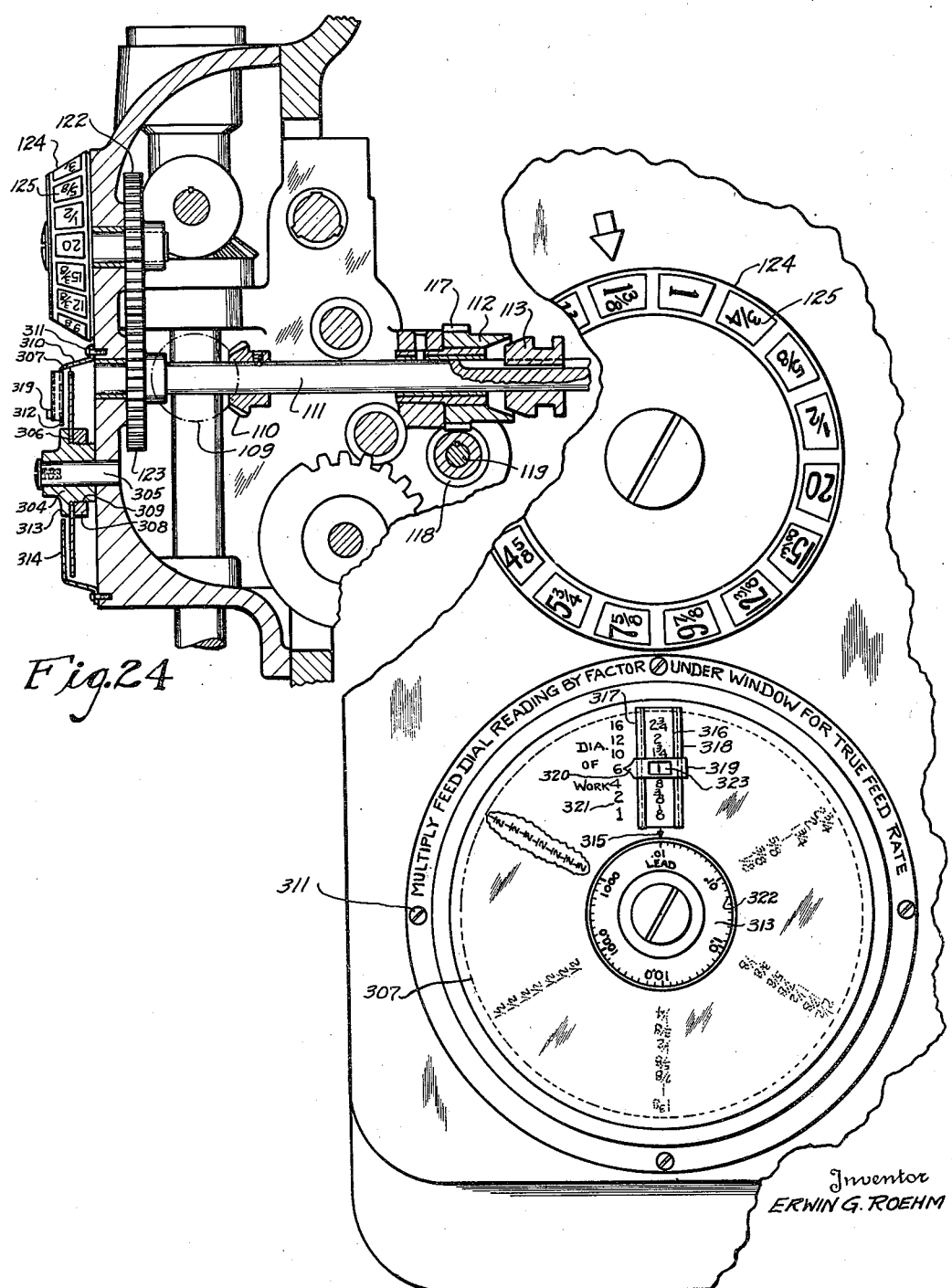
Figure 24 is a detail view of the power train and control mechanism for selectively operating the feed change mechanism.
Figure 25 is a detail view of the outside of the feed box showing the feed rate dial and the correcting factor dial.

A power rate change mechanism is provided in conjunction with the feed transmission, and to this end the shiftable gear couplets 26, 27, 39 and the back gear pair 42—43 are provided with pivoted shifter forks 89, 90, 91 and 92 respectively, as more particularly shown in Figure 23. The shifter forks 89 and 90 are pivoted respectively at 93 and 94 intermediate their length and have rollers or other suitable means at their free ends engaging suitably formed grooves 95 and 96 formed in cams 97 and 98 secured for rotation by the shaft 99. Similarly, the shifters 91 and 92 are pivoted intermediate their length at 100 and 101 and are provided with suitable means at the end thereof for interengagement with other suitably formed grooves 102 and 103 formed in cams 104 and 105. These last two cams are secured to the shaft 106 which is coupled by the gears 107 and 108 in a two to one ratio with the shaft 99 so that the last named shaft will make two revolutions for one revolution of the shaft 106. Shaft 106 is inter-connected through bevel gears 109 and 110 to drive shaft 111. As shown in Figure 24 the shaft 111 is provided with a clutch member 112 adapted to be operatively connected by the shiftable clutch member 113 and gear 114 and 115 to shaft 116. This shaft is connected by inter-meshing spiral gears 117 and 118 to the stub shaft 119 which in turn is constantly rotated by gears 120 and 121 by shaft 25 as more particularly shown in Figure 21. It is thus apparent that whenever the shaft 20 is being driven that rate changes may be power effected by shifting of the clutch member 113 into engagement with the complementary clutch member 112. For the purpose of indicating to the operator the position of the shiftable gears in the feed box and more particularly the feed rate which will actually be effected in the table, taking into consideration the ratio of the various gears in the train connecting the final shaft 44 with the bevel gears 73, 74, the shaft 111 is extended beyond the bevel gears 110, Figure 24, for receiving the spur gear 122 which drives through the inter-meshing spur gear 123, the feed rate dial 124 rotatably mounted on the exterior of the feed box for observation by the operator.

As shown in Figure 25 the numerals 125 appearing on the periphery of the dial indicate the feed rate of the table in inches per minute, and it will be apparent that if the indicated feed rate is the correct rate of the table, then the feed rate may be divided by the pitch of the table lead screw to obtain the revolutions per minute of the table feed screw.

It has always been desirable to utilize the table transmission train for actuation of power driven attachments applicable to the table for special milling operations, such as cutting threads or spiral grooves, in order to save duplication of parts and keep the cost of the machine at a minimum. Since these attachments are usually applied only when special work of the nature mentioned is being performed, it is desirable that the power connections be selective, so that in the one case the table may be operated and controlled alone in the usual manner; and in the other case that the attachment and table may be operated simultaneously and in a predetermined coordinated manner whereby the ratio of the rate of rotation of the work to the rate of longitudinal movement of the table will bear a definite relation to one another, because this ratio in the final analysis determines the angular lead of the spiral. It will also be evident that the square root of the sum of the square of the rate of linear movement of the table, and the square of the rate of linear movement of a point on the circumference of the rotating work will determine the resultant rate of movement between the cutter and work along the spiral path; or in other words will equal what will be termed herein as the spiral feed rate.

In the past, rather cumbersome mechanism involving a large number of parts together with complicated controls have been utilized in order to utilize the conventional table feed transmission for the dual purpose of translating the table alone, as in ordinary milling operations; or rotating a work attachment and translating the table simultaneously as in spiral milling operations.

In the present invention, a simple, compact structure has been developed in which a common reverser is utilized for both methods of operation; a common directional control lever for operating the reverser is provided and very simple means are utilized for connecting this reverser and control mechanism for actuation of the table alone, or simultaneously with an attachment.

Figure 3:
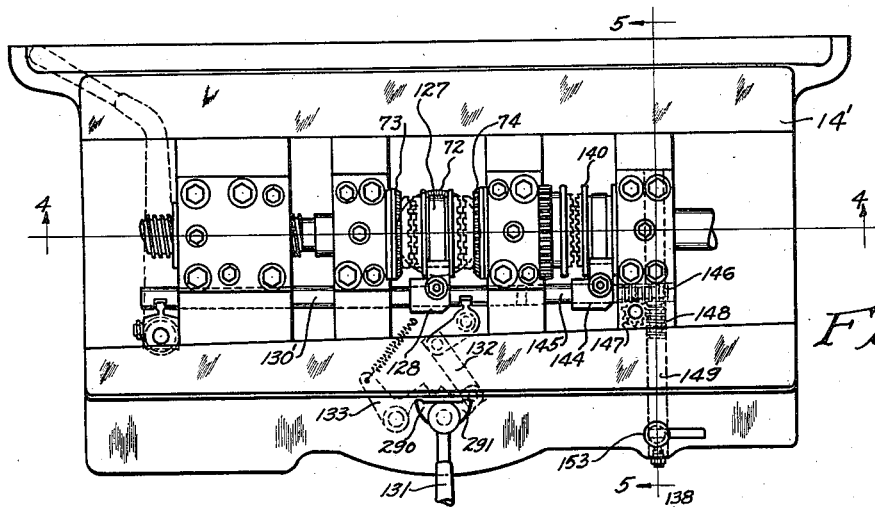
Figure 3 is a plan view of the saddle of the machine shown in Figure 1, with the table removed.
Figure 5:
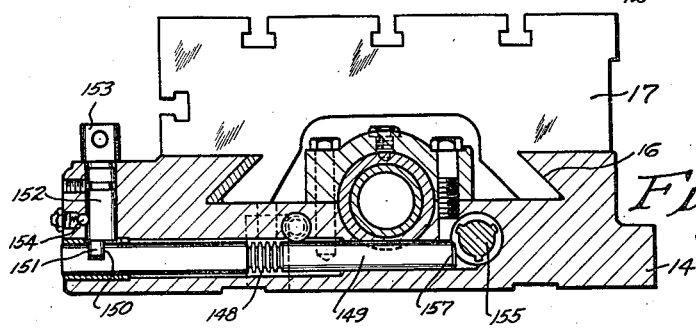
Figure 5 is a section on the line 5—5 of Figure 3.

As shown in Figures 3, 4 and 5 the bevel gears 73 and 74 which go to make up the common reversing mechanism are mounted for free rotation on a sleeve 126 for movement in opposite directions by the gear 72. A shiftable clutch member 127 is splined on the sleeve intermediate gears 73, 74 and is provided with similar clutch teeth 128 on opposite ends thereof for inter-engagement with complementary clutch teeth 129 and 130 formed on the opposing faces of the respective gears 73 and 74. The clutch 127 is shifted by the fork 128, Figure 3, engaging the annular groove 129' of the clutch, said fork being mounted on the shaft 130' which is adapted to be axially moved by the handle 131 through the inter-connecting linkage 132. A spring pressed detent 133 is provided for holding the clutch 127 in any one of its three positions; that is, a central or stop position, or either one of its power transmitting positions at opposite sides of the central position. The lever 131 is so connected through the linkage 132 that it is a directional control lever so that movement to the left by the operator will cause the table to move toward the left, or movement toward the right will cause the table to move toward the right.

This common reversing mechanism and the control therefor is adapted to be utilized in the same manner regardless of whether the table is being driven alone or the table and attachment are driven simultaneously. To this end the sleeve 126 is permanently connected with a gear 134 which has an elongated hub 135 in the end of which teeth 136 are cut for inter-engagement with complementary teeth 137 formed in one end of the sleeve 126. The gear 134 is also in constant engagement with a gear 138 and these two gears are rotated whenever the clutch 127 is moved to a power transmitting position. The gears 134 and 138 therefore constitute the means at the end of the sleeve 126 by which selective connection may be made to drive the table alone, or drive the attachment with the table.

The connection to the table lead screw 139 is directly effected by a shiftable clutch 140 splined on the sleeve 141 which in turn has a splined connection with the lead screw 139. The clutch 140 has teeth 142 for inter-engagement with complementary teeth 143 formed on the face of gear 134. The clutch 140 is shifted by a separate fork 144 fixed to the shifter rod 145 which has annular rack teeth 146 formed at one end thereof. These rack teeth inter-mesh with a pinion 147 which in turn inter-engages similar rack teeth 148 formed on the longitudinally shiftable bar 149. This bar has a small bore 150 formed in the outer end thereof for receiving the eccentric stud 151 formed on the end of a rotatable member 152 which is provided with an operating handle 153 on the upper end thereof. It will be apparent that the clutch 140 has only two positions and a suitable spring pressed detent 154 may be provided in conjunction with the member 152 for holding the parts in either one of its two positions.

The means for effecting a driving connection of the attachment to the sleeve 126 comprises a spline shaft 155 which is part of the attachment and which is insertable in the splined bore 156 of gear 138 when the attachment is applied to the table. Since it is desirable when the attachment is utilized, to modify the rate of movement of the table in accordance with the rate of rotation of the work, the means for effecting this modification is included in the attachment for ready access thereto by the operator and therefore the drive must pass through the spline shaft first and proper connections made from the spline shaft to the lead screw. In order to prevent the possibility of a connection being made in the attachment to the end of the lead screw, while the clutch 140 is engaged and which would result in an attempt to drive the lead screw 139 at two different points, an interlock mechanism has been provided between the clutch 140 and the spline shaft 155. This is of such a nature that the spline shaft cannot be inserted in the bore of gear 138 if the clutch 140 is engaged, or on the other hand if the spline shaft 155 has already been inserted while the clutch 140 is disengaged, the interlock means will prevent engagement of clutch 140. This means comprises an extension of the shaft 149, as more particularly shown in Figure 5, which is of the proper length that when the shaft 149 is moved to a position to disengage clutch 140 the end 157 of shaft 149 will just be out of the path of shaft 155 when the same is inserted; and will be moved into the path of shaft 155 when the clutch 140 is engaged to prevent insertion of shaft 155. There is thus provided a common reverse and control mechanism which may be utilized to drive the table alone, or utilized to drive the attachment and the table simultaneously; a selective mechanism for connecting either the table lead screw or the attachment drive shaft to this common reversing mechanism; and an interlock means to prevent simultaneous connection of the lead screw to two different power sources at the same time. It will be noted that this constitutes a very simple, compact and highly efficient mechanism for the intended purpose.

Figures 6, 7:
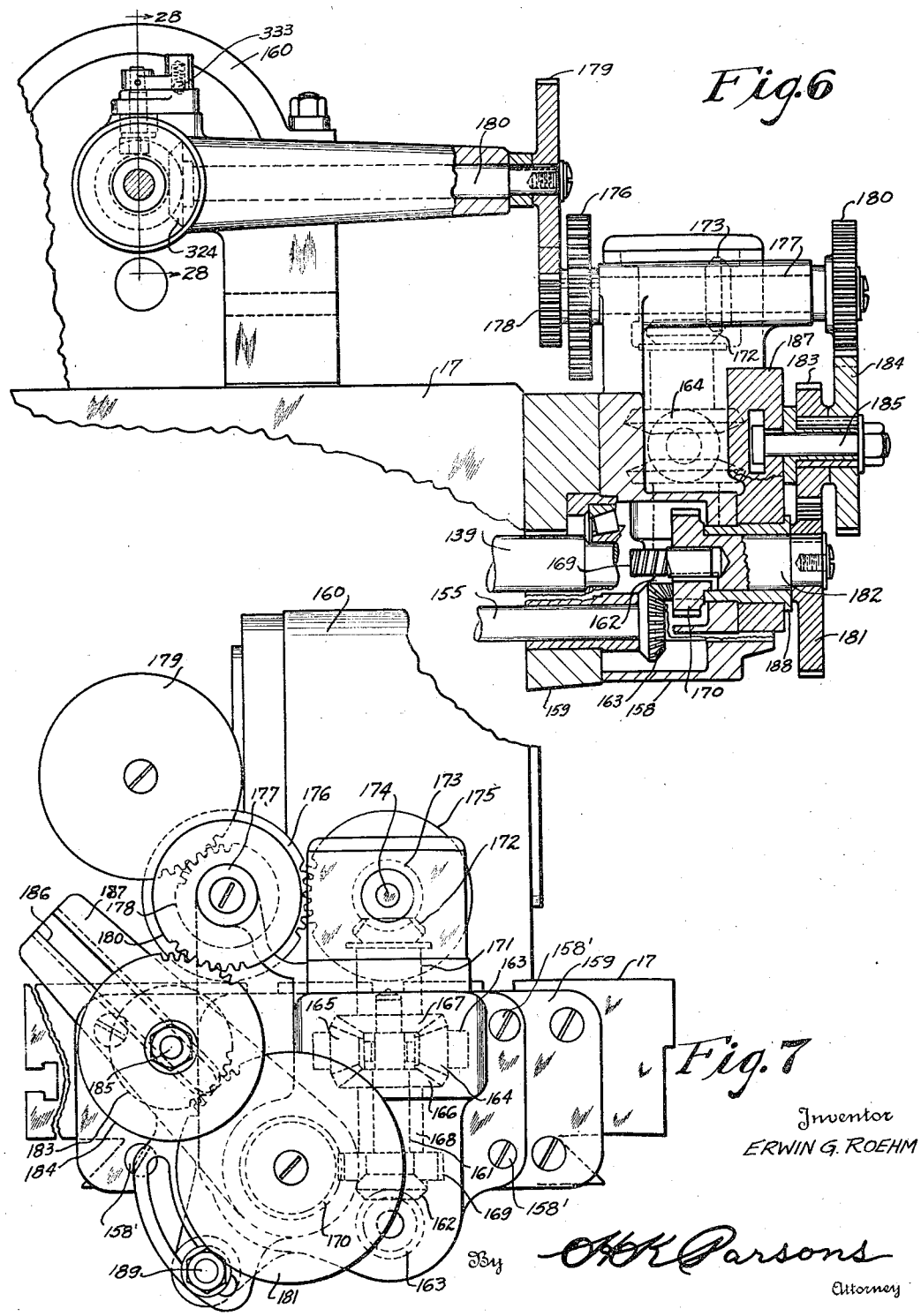
Figure 6 is a view in elevation and partly in section showing the differential mechanism for driving the table and attachment actuators.
Figure 7 is an end view of the mechanism shown in Figure 6.

The spline shaft 155 is carried by the bracket 158 which is adapted to be detachably connected by suitable means such as screws 158' to the apron 159 on the end of the table. An improved and simplified mechanism has been provided in the bracket 158 for effecting connection of the spline shaft 155 in various ratios to the spiral milling head 160 and the table lead screw 139. This mechanism in its simplest form is illustrated in Figures 6 and 7 and comprises mainly a differential device having an input shaft 161 which is connected by bevel gears 162 and 163 to the spline shaft 155. The shaft 161 has a differential cage 163 fixed for rotation therewith and mounted in this cage are a pair of bevel gears 164 and 165 which simultaneously mesh with bevel gears 166 and 167, the latter gears being mounted in coaxial relationship to the shaft 161 but freely rotatable thereon. The bevel gear 166 has an elongated sleeve 168 to the end of which is secured the spiral gear 169. This assembly is mounted for free rotation relative to the shaft 161 and the spiral gear 169 thereof meshes with a spiral gear 170 detachably secured to the end of the lead screw.

The bevel gear 167 also has an elongated sleeve 171 to the end of which is attached a bevel gear 172 inter-meshing with bevel gear 173. A shaft 174 which supports the bevel gear 173 has a change gear 175 fixed to the end thereof for intermeshing with the gear 176 which, as shown in Figure 6, is fixed to the end of shaft 177. The shaft 177 has a gear 178 secured to one end thereof in mesh with gear 179 which is fixed to the end of a drive shaft 180 carried by the spiral head 160. It will now be seen that upon rotation of the cage 163 that the bevel gears 164 and 165 will be bodily moved therewith and will cause rotation of bevel gears 166 and 167 at proportionate rates depending upon the resistance of the two output branches, such as bevel gears 162 and 172 respectively. It is thus possible to obtain any desired proportionate rates of rotation of the two branches by proportionately varying the respective resistances thereof.

This result is obtained in the present instance by connecting across in parallel relation with the differential mechanism between the output shaft 177 of one branch and the output of the other branch represented by the lead screw 139, by a means which will confine or resist the rotation of the two branches to predetermined ratios. One convenient form that this means may take is a plurality of change gears whereby the ratio of the two branches may be conveniently changed or varied to suit the requirements of the work being performed. As shown in Figure 6, a gear 180 is secured to the end of shaft 177 and a gear 181 secured to the end of the hub 182 of spiral gear 170 which in turn is assembled in splined relation to the lead screw 139 upon assembly of the bracket 158 with the apron 159. An intermediate pair of gears 183 and 184 are mounted on the laterally adjustable stud shaft 185 whereby the gear 184 may be positioned in mesh with gear 180 and gear 183 in mesh with gear 181. The stud shaft 185 is not only adjustable in one direction in the T-slot 186 formed in the arm 187, but in a second direction by the arm 187 pivoted about the fixed sleeve 188 and held in adjusted positions by a clamping bolt 189.

Attention is invited to the fact that the change gears 180, 184, 183 and 181 constitute merely a means for establishing the ratio of the rates of rotation of shafts 171 and 168 of the differential mechanism, and that the differential mechanism is permanently connected at all times to the spiral dividing head and the lead screw and that no change is made in the respective branches at any time as when the ratios of their relative movements are altered by the change gears. It will also be noted that due to the differential mechanism that the sum of the rates of rotation of the two branches is always a constant, and that this constant can never be greater than twice the rotation of the shaft 161 which drives the differential cage. Therefore, when both output branches are being driven at the same rate, this rate will be equal to the rate of rotation of the input shaft 161. It will thus be seen that a simple differential drive mechanism has been provided in which the two output branches thereof are permanently connected to the driven parts, and that a very simple means have been provided for changing the ratio between the two branches.

In order to reverse the direction of rotation of the work relative to the direction of rotation of the screw, the dividing head 160 may be provided with a built-in reversing mechanism comprising a bevel gear 324 secured to shaft 180, intermeshing with bevel gears 325 and 326 to effect opposite rotation thereof. Gears 325 and 326 are mounted for free rotation at opposite sides of clutch member 327 on shaft 328 to which the clutch member is splined. The opposite ends of member 327 are provided with clutch teeth for intermeshing with complementary clutch teeth on the opposing faces of bevel gears 325 and 326. The clutch member may be shifted by a stud 329 engaging the annular groove 330 in member 327, said stud being mounted eccentrically on the end of the shaft 331 extending vertically through the top of the housing for rotation by the manually operable lever 332. A spring pressed detent 333 may be utilized for holding the parts in different operative positions.

In Figures 8, 9, 10 and 11 a modified form of the invention is illustrated which is capable of yielding a larger range of rates and suitable for obtaining a variety of extremely long leads as well as a variety of short leads, but the same differential mechanism is utilized in each form. To facilitate this the differential ratio changing mechanism is divided into a quick change mechanism for approximating the desired ratio and a change gear mechanism for accurately effecting the desired ratio. The quick change mechanism is divided into steps, which steps in the present instance vary as a geometric progression having a constant multiplier of 10.

Figure 10:
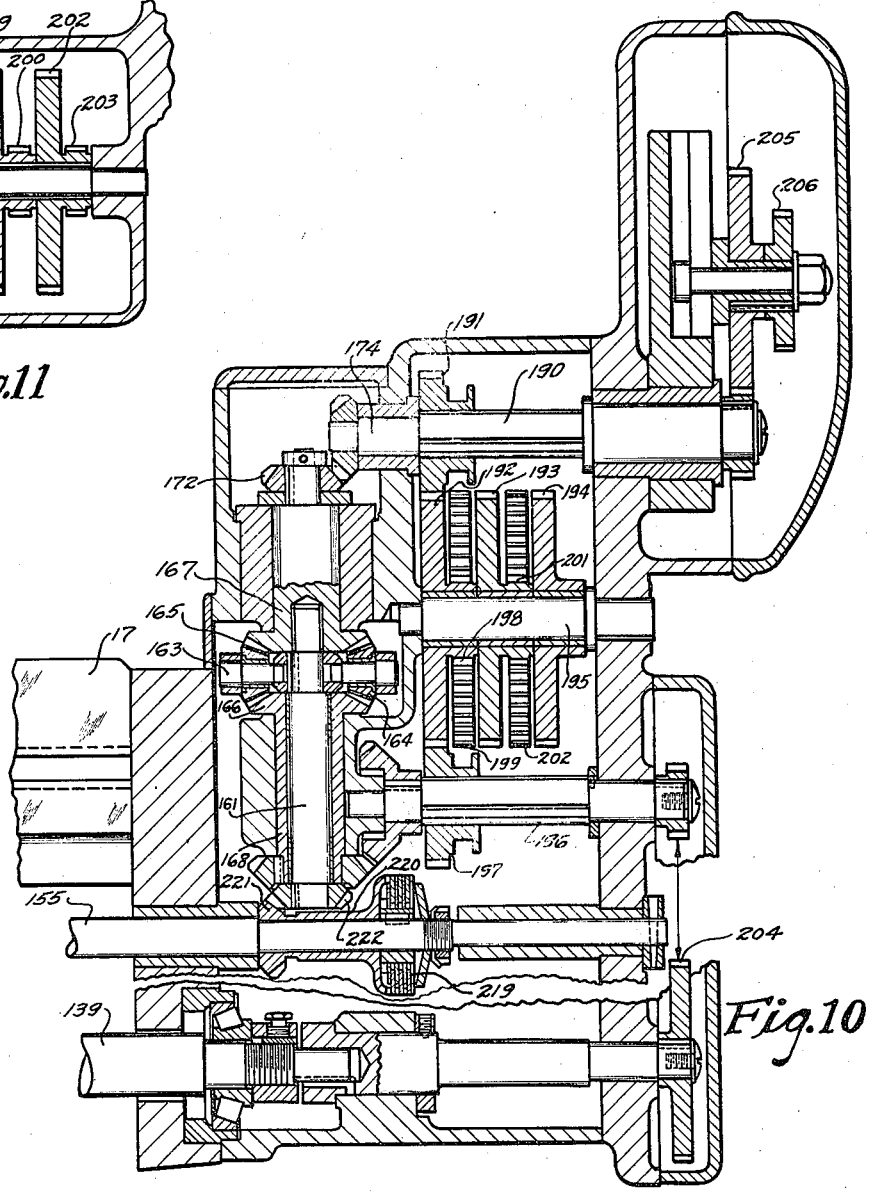
Figure 10 is an expanded view of the transmission train shown in Figure 8, as viewed on the line 10—10 of that figure.

This arrangement is more particularly shown in the expanded view in Figure 10 in which one output shaft of the differential mechanism is provided with a splined portion 190 on which is mounted a slidable gear 191. This gear is adapted to be selectively inter-meshed with any one of the three gears 192, 193 or 194 mounted for free rotation on a shaft 195. A second spline shaft 196 is provided with a shiftable gear 197 adapted to be moved into engagement with the gear 192 to provide a one to one ratio between shafts 190 and 196; or into engagement with gear 193 which is driven from gear 192 through pinion 198, gear 199 and pinion 200 to provide a one to ten reduction, and thereby establish a ratio of 10 to 1 between shafts 190 and 196; or into mesh with gear 194 which is driven in turn from gear 193 through pinion 201, gear 202 and pinion 203 to provide a second 1 to 10 reduction in series with the first one to thereby provide a ratio of 100 to 1 between shafts 190 and 196.

If the shaft 196 is now connected to the lead screw 139 in a one to one ratio by means of gears indicated generally by the reference numeral 204, the ratio between the rate of rotation of the lead screw and of the attachment will be such and is so designed as to give a lead of 10". This will be true when the gears 191 and 197 are each in mesh with gear 192 as shown in Figure 10. If now the gear 197 is shifted into mesh with gear 193 the lead will be reduced by the factor 10 due to the fact that the rate of rotation of the head has been increased, and the rate of movement of the lead screw has been reduced relative thereto, and this will yield a lead of 1". Likewise, movement of the gear 197 into engagement with the gear 194 will give a lead of 0.1".

If the gear 197 is now maintained in the position shown in Figure 10 and the gear 191 shifted into mesh with gear 193 the rate of movement of the table will be increased relative to the rate of movement of the head by the factor 10 thereby giving a lead of 100". Similarly, movement of gear 191 into mesh with gear 194 will change this ratio again by the factor 10 and yield a lead of 1000". By using a quick change mechanism, the change gear mechanism 204 does not have to include such a large number of gears as would otherwise be necessary, but only enough gears to provide changes from a one to one ratio between shaft 196 and lead screw 139 to a 1 to 10 ratio. By use of a 1 to 10 reduction it will be apparent that the lowest lead of the quick change mechanism may be further reduced to .01". It is thus possible with this mechanism to obtain leads ranging from a short lead of .01" to a long lead of 1000".

Figure 28:
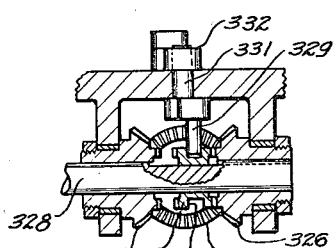
Figure 28 is a section on the line 28—28 of Figure 6.

The shaft 190 may be connected directly through idler gear 205 to the drive gear 179 of the spiral head, or indirectly connected through idlers 205 and 206 to change the direction of rotation of the dividing head relative to the lead screw as, for instance, when cutting left hand spirals. The change in direction may also be accomplished by using a spiral head having a self-contained reverser as shown in Figures 6, and 28.

The shifting of gears 191 and 197 is accomplished through a mechanism which limits the positions of the gears to the six combinations enumerated, because other combinations would be possible but would be duplicates. This mechanism comprises a shifter fork 207 pivotally mounted on the pin 208 and the shifter fork 209 for gear 197 pivotally mounted on a pin 210. The shifter fork 207 has a roller 211 secured thereto riding in the cam path 212, and the shifter 209 has a roller 213 also riding in this cam path. The cam path is formed in a cam member 214 secured to the end of shaft 215 rotatable by a handle 216. A dial 217 is also secured to the shaft 215 for indicating to the operator the leads produced by the various positions of the two shiftable gears of the quick change mechanism assuming of course no reduction in change gears 204. A spring pressed detent member 218 serves to hold the parts in the various positions. The cam path 212 is so formed as to move the gears successively to the various positions to increase the lead by steps from .1" to 1000" by means of less than a single rotation of the shaft 215.

As a matter of safety it will be noted in Figure 10 that the spline shaft 155 is operatively connected by a friction clutch 219 to the hub 220 of a bevel gear 221 which intermeshes with bevel gear 222 to drive the differential cage through shaft 168. This is so adjusted as to prevent overload on the spline shaft and drive thereto.

Figures 14, 15, 16:
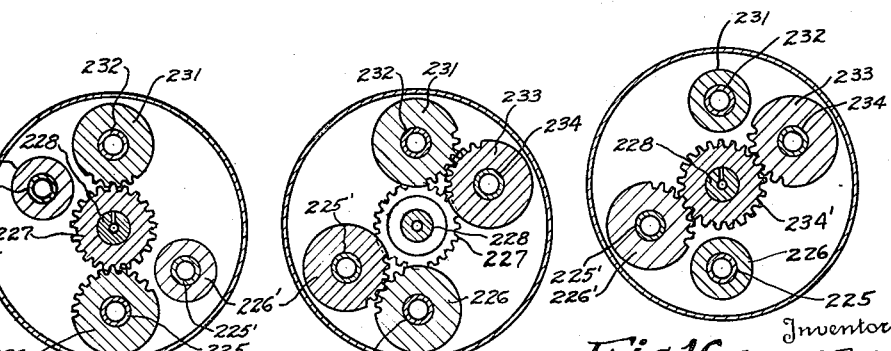
Figure 14 is a section on the line 14—14 of Figure 13.
Figure 15 is a detail section on the line 15—15 of Figure 13.
Figure 16 is a detail section on the line 16—16 of Figure 13.

Another modification of the invention is shown in Figures 12 to 18 inclusive. In this form of the invention the spline shaft 155 has a gear 222 secured thereto which rotates through an intermediate idler 223, the differential cage 224. As shown in Figure 14 the cage carries a first shaft 225 upon which is mounted a gear 226 in mesh with a central gear 227. The gear 227 is mounted for free rotation on the central shaft 228 and is connected by teeth 229 formed on the end of the hub of the gear with complementary teeth formed on the hub of gear 230, also mounted for free rotation relative to the shaft 228. Another gear 231 is mounted on a shaft 232 carried by the differential cage for bodily movement therewith, and this gear is sufficiently long so that its teeth overlap the teeth of a gear 233 mounted on a third shaft 234 carried by the differential cage. This last named gear 233 intermeshes with a second gear 234' mounted for free rotation on the shaft 228 and interconnected through end teeth 235 to the second output member of the differential mechanism comprising a gear 236. The gear 234' also meshes with gear 226' freely rotatable on shaft 225', which is elongated so as to mesh with gear 226, Figure 15.

It will now be seen that as the cage 224 rotates, the shafts 225, 225', 232 and 234 and the supported gears will be bodily moved around with it. Considering the gear pair 226, 226' it will be seen that the gear 226 meshes with the output gear 228 of one branch, Figure 14, and gear 226' meshes with gear 234' Figure 16, of the other branch. And since these two gears intermesh as shown in Figure 15, the rate of rotation of the two output branches will depend upon the respective resistances thereof. The other gear pair 231, 233 act in the same way and serve to counterbalance the drive of the first gear pair.

The output member 236 intermeshes with gear 237 splined on shaft 238, and the output member 230 intermeshes with gear 239 splined on shaft 240 and these two shafts are interconnected by a quick change mechanism similar to the one just described in connection with Figure 10. In other words, the shaft 238 carries the gear 191 and the shaft 240 carries the gear 197. The output shaft 240 is provided with a change gear 241 adapted to be connected by intermediate gearing 242 and 242' with the final gear 243 secured to the end of the lead screw.

The shaft 238 representing the other output members is connected through an intermediate train of gears indicated generally by the reference numeral 244 to the attachment drive shaft 180. This train comprises gears 292, 293, 294 and 295, the gear 295 being secured to the end of shaft 180 and gear 292 being secured to the end of shaft 238. Gear 293 is carried by the arm 296 adapted to swing about the shaft 238 as a center to adjustably position gear 293. Bolt 297 serves to clamp the arm in position. Gear 294 is carried by a second arm 298 adapted to be swung about the axis of shaft 180 as a center to adjustably position gear 294. This arm is clamped by bolt 299 which engages an arcuate slot 300 formed in the arm concentric with the center of rotation. For reversing the drive of the head relative to the table, the bolt 299 is removed and the arm 298 swung clockwise until a second arcuate slot 301 is adjacent the hole for bolt 299. This removes gear 294 from the train and the bolt 299 is replaced to hold the arm 298 in its new position. The arm 296 is then rotated clockwise to mesh gear 293 directly with gear 300.

Manual rotation of the parts may be effected by a gear 245, Figure 17, secured to the end of the spline shaft 155 to which a removable gear 246 may be selectively intermeshed, this gear having an elongated hub 247 to which is integrally attached the operating handle 248. This gear and handle are detachably mounted on a stud shaft 249 for relative rotation thereto but in order to apply the same to the shaft the cover 250 of the bracket 251 must be opened in order to prevent interference of the parts. For this purpose, the cover 250 is hinged at 252 and 253 as shown in Figure 12, and this cover is held in a closed position by a lock pin 254.

In this form of the invention the quick change gears are shifted by two levers 255 and 256, and an interlock pin 257 is provided between them for alternate engagement with a notch 258 or a notch 259 formed in plates 260 and 261 carried by the respective shift levers. In other words, when the levers are in the position shown in Figure 18, the gears 191 and 197 are in a position corresponding to the position shown in Figure 10, but upon movement of either one from that position the interlock pin will be forced into the notch of the opposing lever to prevent its movement while the first shifter is in either one of its other two positions.

Figure 12:
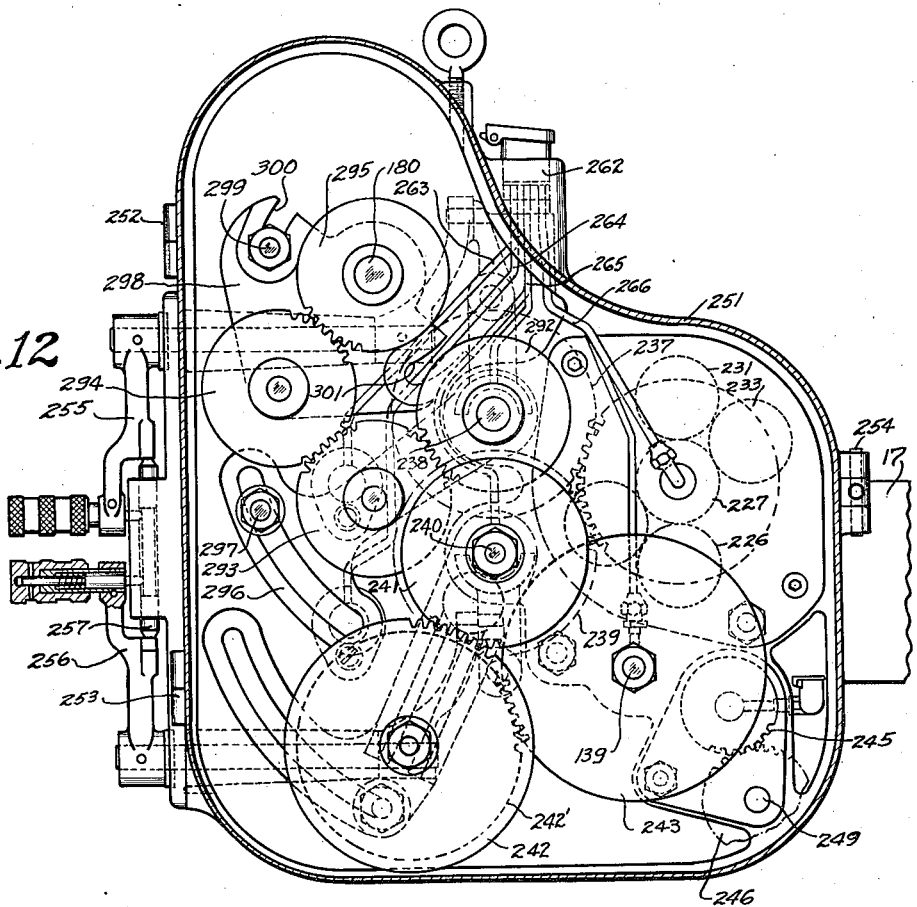
Figure 12 is a view in elevation of another modification of the invention.

The bracket 251, as shown in Figure 12, is provided with a lubricant oil reservoir 262 at the upper part thereof, and this reservoir is connected by individual pipes, such as 263, 264, 265 and 266 to the various shafts and bearings in the bracket whereby all the parts may be lubricated from a central oiling station in the bracket.

Figure 2:
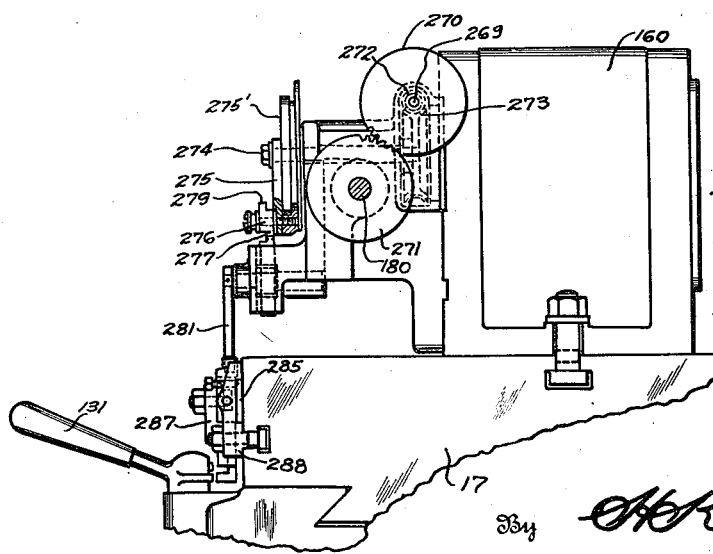
Figure 2 is an end view of the attachment and table control mechanism.

Difficulty has been experienced in the past in obtaining accurate tripping of the reversing mechanism when the table was the slower moving member, and especially when cutting the shorter leads. Means have therefore been provided in connection with this invention whereby more accurate tripping may be obtained when cutting shorter leads, and to this end use is made of the faster moving member, which would be the driving shaft of the dividing head. As more particularly shown in Figure 19, the mechanism may be supported by a casting 267 formed integral with the horn 268 of the dividing head 160 which supports the drive shaft 180. A shaft 269 is journaled in this casting and provided with a gear 270 on one end as more particularly shown in Figure 2 for inter-engagement with an additional gear 271 secured to the end of drive shaft 180 whereby the shaft 269 will be continuously rotated during operation of the head. The shaft 269 carries a worm 272 which meshes with a worm gear 273 in the same ratio as the ratio of the worm and worm gear in the attachment, which is usually 40 to 1. The worm gear 273 is secured to a shaft 274 which carries an arm 275 and plate 275'. Fixed to the other end of this arm is a reversible dog 276 having one end 277 lying in a plane adapted to engage a plunger 278 and the other end 279 lying in a plane adapted to engage a plunger 280. From this it will be seen that the plungers 278 and 280 also lie in different planes for proper engagement with the one or the other end of the dog 276.

These plungers are inter-connected with the oscillatable arm 281 which has a ball-shaped end 282 mounted between two fixed pins 283 and 284 as more particularly shown in Figure 20, which are carried by the reciprocable dog rail 285. When this device is used, the trip dogs 286 and 287 are mounted on this reciprocable dog rail which is held in place by circumscribing brackets 288 at opposite ends and held in a central position by oppositely acting spring plungers 289 carried by the brackets. As the table moves slow to bring one or the other of the dogs into engagement with the wings 290 and 291 integral with the trip handle 131, the arm 275 will be rotating at such a rate as to depress one or the other of the plungers and thereby move the dog rail at a faster rate than the table is moving and insure an accurate trip. If, of course, the table has not moved far enough to position one of the dogs 286, or 287 adjacent the trip plunger, the dog rail will merely be oscillated the given amount by the plungers 278, or 280 and nothing will happen. This makes it possible for the work to be given a number of revolutions before tripping.

When the table is the faster moving member the dog rail 285 is removed, and dogs 302 and 303, Figure 1, are utilized in the conventional manner.

As previously mentioned the feed mechanism has a dial associated with the power shifter therefor which will indicate for any given setting of the feed mechanism the feed rate of the table, or in other words the rate of rectilinear movement thereof. If the cutter is mounted on a fixed axis and the work is fixed to the table this rate of rectilinear movement will also be the rate of relative movement between the cutter and work. In spiral milling operations, however, the work is given a rotating movement in addition to the bodily movement imparted to it by the table, and in such a case the feed dial no longer serves to indicate the true rate of relative movement between the cutter and work.

In all milling machine work it is customary for the operator to size up a given job and determine what is the best feed rate to use, considering all the variable elements, such as the type and size of the cutter, the kind of material of which the work is composed, the rigidity of the fixtures, the depth of the cut, etc., and then to set the machine to yield this desired feed rate as closely as possible. In plain milling operations, as described heretofore, there is a means on the machine for indicating the feed rates obtainable and the operator selects the one nearest the desired feed rate.

In spiral milling operations there has been nothing in the past so far as can be ascertained to indicate, even approximately, to the operator where he could set the feed box to obtain a desired feed rate. At the present time it is merely a guess, the operator selecting one rate and then if it looks to be too fast or too slow, he makes an approximate correction in the other direction. By means of the present invention, all of this guess work is eliminated and suitable mechanism provided whereby the operator will know, taking into consideration the diameter of the work and the lead to be cut, the actual spiral feed rate that will be obtained for any given setting of the feed rate dial.

To this end there has been associated with the feed rate dial a second dial more particularly shown in Figures 24 and 25, comprising a hub member 304 rotatably mounted on a fixed stub shaft 305. The member 304 is provided with a shoulder 306 on which is fixed a circular disk 307 for rotation therewith by an annular nut 308 threaded on a reduced portion 309 of the hub. A cover plate 310 is secured, as by a plurality of screws 311, to the frame of the machine in such position as to entirely cover the disk 307. The plate, however, has a central circular opening 312 through which the hub 304 projects, but only a sufficient amount to allow the face 313 of the hub to be coplanar with the outer face 314 of the cover plate. This makes it possible for the face 313 of the hub to be graduated to show the range of leads possible with this device and have the graduation marks cooperate with a fixed arrow 315 carried by the coverplate.

A radial slot 316 is formed in the cover plate in radial alignment with the arrow 315, this slot forming a window of sufficient width to expose a row of factors carried by the plate 307. The metal removed to form this opening is flanged at 317 and 318 to form a guide for a slider 319 which has its ends turned inward to frictionally engage the flanges or guideways 317 and 318. This slider is provided with a pointer 320 on one end to cooperate with a series of figures indicated generally by the reference numeral 321, which figures indicate the range of work diameters possible of being cut on the machine. When the dial 307 is positioned to align a row of factors with the arrow 315, the slider 319 may be moved to a position such that the pointer 320 will indicate the diameter of the work to be operated upon. The position of the dial 307 will be determined by the lead to be cut and therefore will be rotated until the proper one of the graduations 322 on the hub 313 is opposite the arrow 315. It will now be seen that the arrow 315 indicates the lead to be cut and the arrow 320 indicates the diameter of work to be operated upon. This will position the window 323 of the slider 319 over the correct factor to be applied to the rate setting of the feed dial 124 whereby multiplication of the feed rate dial by the exposed factor will immediately give to the operator the true spiral feed rate. There has thus been provided a means which may be adjusted in accordance with the lead to be cut and the diameter of the work which will indicate at a glance the true feed rate for any setting of the feed rate dial.

Only a sufficient number of work diameters have been shown on the dial to explain the invention, it being understood that the range may be extended or additional intervening sizes added depending upon the accuracy desired. Also representative rows of factors have been shown on the dial 307 to indicate their position and arrangement, it also being understood that additional intervening radial rows of factors will be applied for the intervening graduation marks on the hub 304, within the possibilities of the space available. Since the factors change more rapidly and over a wider range for the smaller leads, the quadrants containing the factors for the smaller leads may have greater included angles, than those for the larger leads without departing from this invention.

Figures 8, 9:
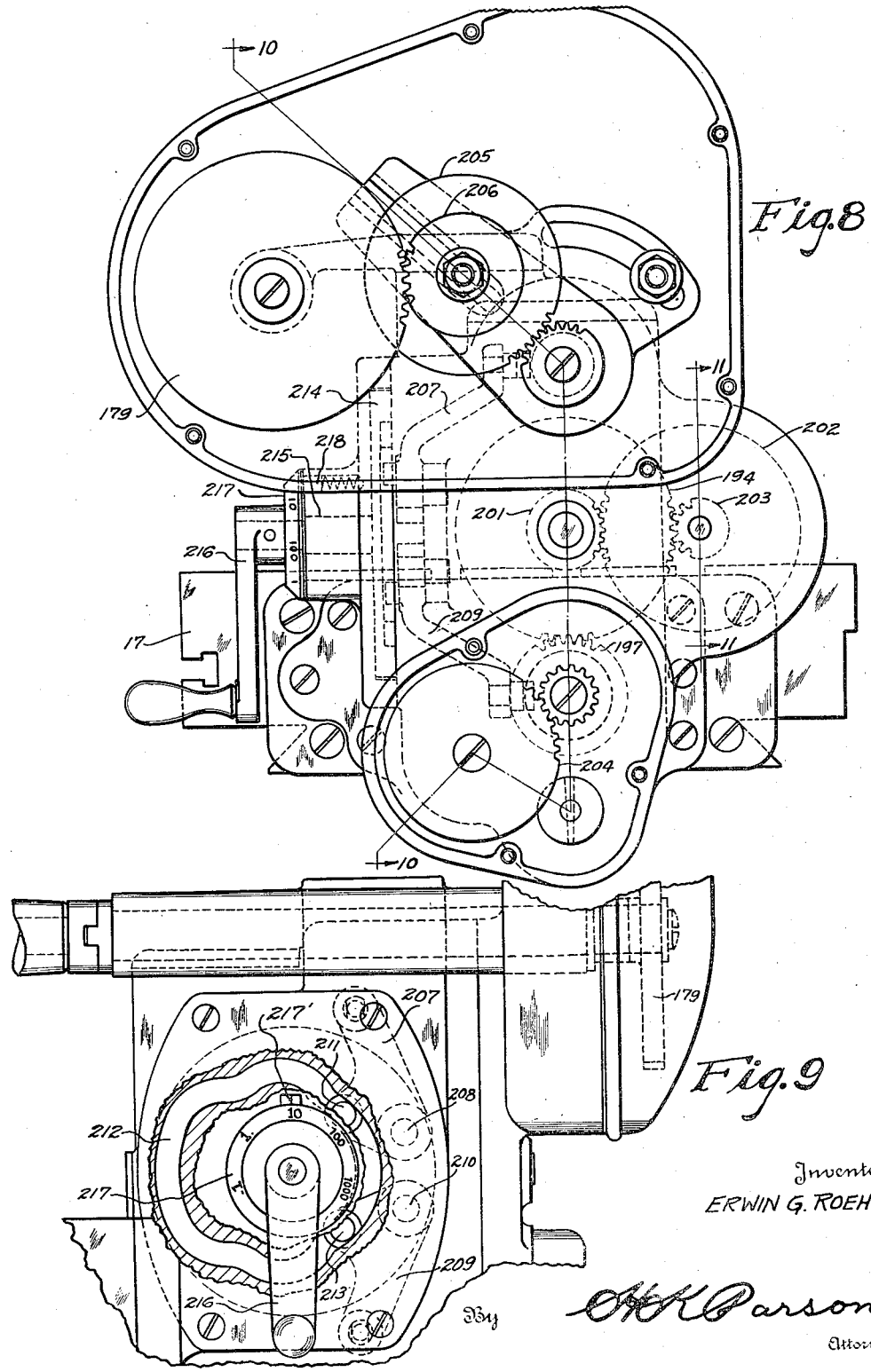
Figure 8 is an end view of a modified form of mechanism for driving the attachment and table actuators.
Figure 9 is a detail view partly in section of the rate changing control mechanism shown in Figure 8.
Figure 11:
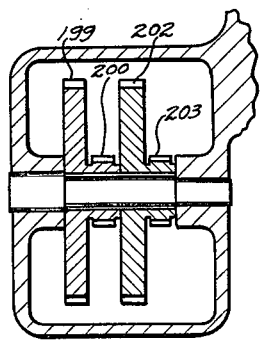
Figure 11 is a detail section taken on the line 11—11 of Figure 8.
Figures 26, 27:
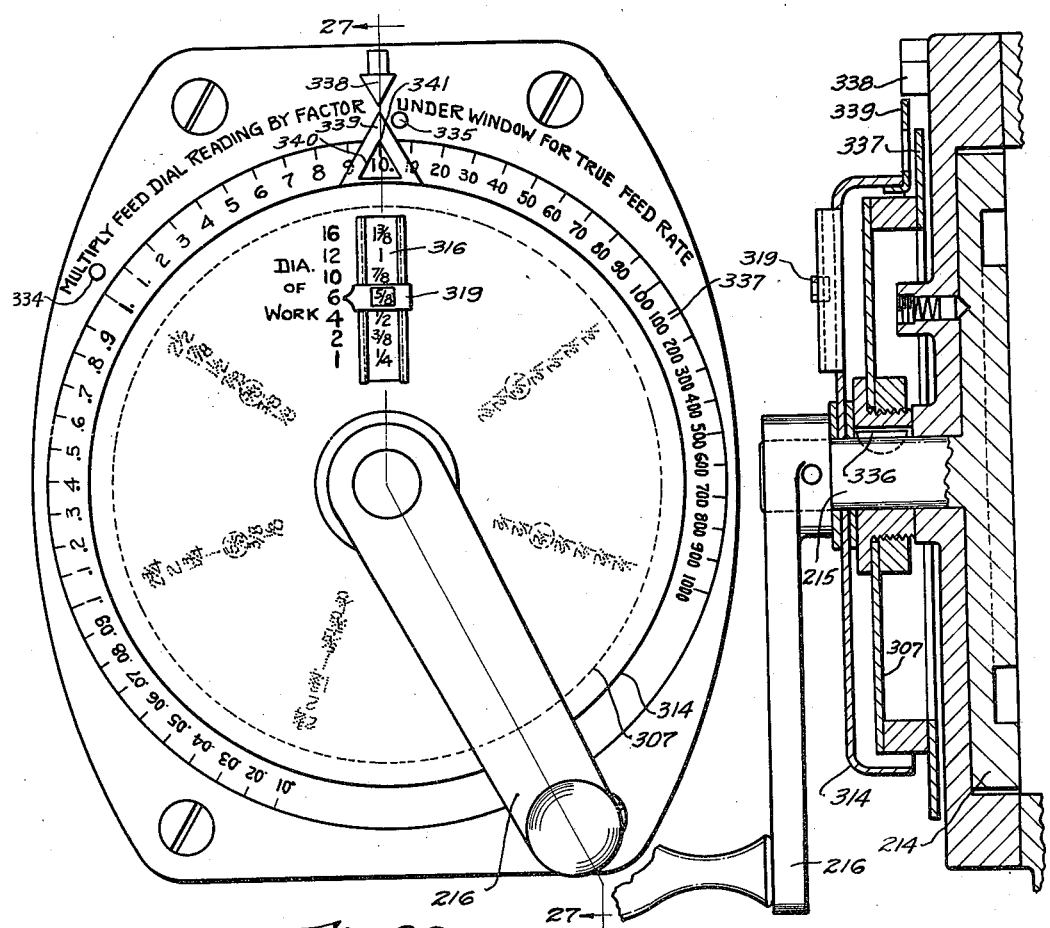
Figure 26 is a view showing the factor dial applied to the form of the invention shown in Figures 8, 9 and 10.
Figure 27 is a section on the line 27—27 of Figure 26.

It is also contemplated within the scope of this invention that the dial 307 may be attached directly to the shaft 215 of the quick rate change gear shifter mechanism, when the modification shown in Figures 8 and 9 is utilized, as more particularly illustrated in Figures 26 and 27. By this arrangement the dial is automatically set with the setting of the quick change gears. Since the change gears 204 of the construction shown in Figures 8, 9 and 10 are utilized to modify or reduce the lead effected by the quick change gears, provision may be made for rotatably mounting the cover plate 314 so that the same will have a range of movement through a quadrant included between stop pins 334 and 335 sufficient to indicate the intervening leads obtainable with the change gears. To this end the plate 307 which carries the factors is keyed at 336 for rotation with shaft 215 and has the annular graduated plate 337 attached to its periphery, on which are indicated the lead graduations, the radial rows of factors being aligned with these graduations. A fixed arrow 338 cooperates with these graduations to indicate the setting of the quick change gears. The window carrying plate 314 has peripheral projection 339 in which is formed a triangular window 340 having its apex 341 radially aligned with the center of the window 316, this apex also cooperating with the lead graduations on part 337. From this it will be seen that the operator rotates the handle 216 and approximately selects the lead by aligning one of the main graduations such as 1, 10, 11, etc., under fixed arrow 338. He then rotates the member 314 to select the specific lead desired. The proper change gears 204 are then put in position. By moving the slider 319 the proper factor in accordance with the diameter of the work can be selected, which may then be applied in setting the feed rate dial to preselect a suitable feed rate. This construction is to be considered as illustrative only, it being apparent to those skilled in this art that various degrees of refinement in graduations may be made, depending on the size of the dials and the space alotted for the purpose.

There has thus been provided an improved transmission for the intended purposes, together with an improved control mechanism whereby selectivity of operation, accuracy of tripping are enhanced and the determination of spiral feed rates greatly simplified.

What is claimed is:

1. In a transmission for milling machines, the combination with a table lead screw, of a sleeve mounted for free rotation coaxially of the screw, a pair of oppositely driven members rotatably mounted on the sleeve, a common driver for actuating said members, a clutch mounted on the sleeve intermediate said members for selective coupling thereof to effect reverse rotation of the sleeve, means coaxial of the sleeve for selective coupling thereof to the screw for effecting rotation thereof in accordance with the direction of rotation of the sleeve, said means including clutch teeth formed integral with one end of the sleeve, a clutch member operatively coupled in coaxial relation with the screw, and means to shift said member to effect power coupling of the screw with the sleeve.

2. In a transmission for milling machines, the combination with a table lead screw, of a sleeve mounted for free rotation coaxially of the screw, a pair of oppositely power driven members rotatably mounted on the sleeve, a clutch mounted on the sleeve intermediate said members for selective coupling thereof to effect reverse rotation of the sleeve, means coaxial of the sleeve for selective coupling thereof to the screw for effecting rotation thereof in accordance with the direction of rotation of the sleeve, said means including clutch teeth formed integral with one end of the sleeve, a clutch member operatively coupled in coaxial relation with the screw, means to shift said member to effect power coupling of the screw with the sleeve, and additional means for shifting the first named clutch to determine the direction of rotation of the screw.

3. In a transmission for a milling machine table, the combination with a rotatable actuator for the table, of a power train therefor, a first clutch coaxial of the actuator for selectively coupling the train for reverse rotation of the actuator, and a second clutch in coaxial relation to the first clutch for disconnecting the actuator from the influence of the first clutch.

4. In a transmission for a milling machine table having an attachment thereon, the combination of an actuator for the table, an actuator for the attachment, a power train, motion transmitting connections therefrom including an oppositely rotatable sleeve mounted coaxially of the table actuator, and means adjacent one end of the sleeve for selectively coupling the sleeve to the table actuator or to the attachment actuator.

5. In a transmission for a milling machine table having an attachment thereon, the combination of an actuator for the table, an actuator for the attachment, a power train, motion transmitting connections therefrom including an oppositely rotatable member mounted coaxially of the table actuator, and separate means adjacent one end of said member for coupling the table actuator and the attachment actuator respectively to said sleeve.

6. In a transmission for a milling machine table having an attachment thereon, the combination of an actuator for the table, an actuator for the attachment, a power train, motion transmitting connections therefrom including an oppositely rotatable sleeve mounted coaxially of the table actuator, separate means adjacent one end of the sleeve for coupling the table actuator and the attachment actuator respectively to said sleeve, and interlock means to prevent simultaneous functioning of said separate means.

7. In a transmission for a milling machine table having an attachment thereon, the combination of an actuator for the table, an actuator for the attachment, a power train, motion transmitting connections therefrom including an oppositely rotatable sleeve mounted coaxially of the table actuator, separate means adjacent one end of the sleeve for coupling the table actuator and the attachment actuator respectively to said sleeve, said separate means including a rotatable member having a splined bore for interconnection with the attachment actuator, and a second rotatable member having means thereon for selective interconnection with the table actuator.

8. In a machine tool transmission, the combination of a first rotatable member, a second rotatable member, a common power train therefor including a reverser, a table actuator, means for coupling the actuator to one of said members, said first rotatable member having a splined bore for receiving an attachment drive shaft insertable therein, means to shift said reverser including an axially movable member, said member having a portion thereon for interfering with assembly of the attachment drive shaft with the first rotatable member upon axial movement to a power transmitting position.

9. In a machine tool transmission for driving a table and an attachment carried thereby, the combination of a table actuator, an attachment actuator, a power train, a differential mechanism having an input member and two output members, means coupling the input member to said train, means coupling the output members to the respective actuators, and adjustable means for determining the ratio of the rates of rotation of the output members by said train.

10. In a transmission for a milling machine having a table and an attachment including a work rotator mounted thereon, and an actuator for the table, the combination of means for imparting proportional rates of movement to the actuator and rotator including a power train, a pair of members driven thereby, means connecting the members respectively to the actuator and rotator, differential gearing coupling the train to the driven members, means to constrain the rates of rotation of the driven members to a variable ratio, a common reverser in the power train for simultaneously changing the direction of rotation of the actuator and rotator, and an additional reversing means for changing the relative direction of rotation between the table actuator and the work rotator.

11. In a transmission for a milling machine having a table and an attachment including a work rotator mounted thereon, and an actuator for the table, the combination of means for imparting proportional rates of movement to the actuator and rotator, including a driver, a power train operatively connected to the driver, a pair of driven members, motion transmitting means connecting the members to the actuator and rotator respectively, differential gearing coupling the driver to the driven members, means to constrain the rates of rotation of the driven members to different predetermined ratios, a reverser in the power train for simultaneously changing the direction of rotation of the parts, an additional reversing means for changing the relative direction of rotation between the table actuator and the work rotator, and a safety clutch in the power train to the driver.

12. In a transmission for a table actuator and an attachment actuator of a machine tool, the combination of a power driver, two branches, differential gearing connecting the driver for actuation of the branches, parallel shafts in the respective branches, quick change gearing interconnecting said shafts for constraining said differential to yield different proportionate rates of shaft rotation, means including a reverser for connecting the shaft of one branch to the attachment actuator, and means including change gearing for connecting the shaft of the other branch to the table actuator.

13. In a transmission for effecting simultaneous rotation of a table actuator and an attachment actuator of a milling machine, the combination of a power driver, two branches, differential gearing connecting the driver for actuation of the branches, a shaft in each branch, a shiftable gear mounted on each shaft, a plurality of intermediate gears connected together in a geometrically progressive ratio, means to maintain either shiftable gear in mesh with the first of said intermediate gears while permitting selective engagement of the other shiftable gear with the remainder of said intermediate gears whereby the rate of rotation of either branch may be reduced relative to the other, means including a reverser for connecting one of said shafts to one of said actuators, and means including change gearing for connecting the other of said shafts to the other of said actuators.

14. In a milling machine having a table and a spiral work head thereon, the combination with an actuator for the table, an actuator for said head and a power shaft, of means for connecting said shaft for proportional rotation of the actuators including a differential mechanism having an input member connected to said power shaft, and branch output shafts, means interconnecting said shafts for constraining said differential to yield proportionate rates of shaft rotation including a shiftable gear on each shaft, an intermediate shaft, a plurality of intermediate gears mounted on the last named shaft and connected together for rotation at geometrically progressive rates, means to position both of said shiftable gears in mesh with the first of said intermediate gears to establish a one to one ratio between the branches, and means to shift either shiftable gear into mesh with the remaining intermediate gears while maintaining the other shiftable gear in mesh with the first intermediate gear to thereby reduce the rate of rotation of either branch relative to the other.

15. In a machine tool the combination with a transmission for effecting simultaneous movement of two movable members at different rates, of control means for said transmission including a trip operable part for simultaneously terminating movement of the members, and means selectively positionable for tripping said part from the faster of the two moving members.

16. In a machine tool the combination with a transmission for effecting simultaneous movement of two movable members at different rates, of control means for said transmission including a trip operable part for simultaneously terminating movement of the members, means selectively positionable for tripping said part from the faster of the two moving members, said means including a dog, a rail for supporting said dog, and operative connections between the rail and each of said members.

17. In a milling machine having a cutter and a table movable transversely of the cutter, the combination with a feed transmission terminating in a clutch having a neutral position and a power transmitting position on either side thereof, of an attachment mounted on the table, a train extending from said clutch to the attachment, and means operable by said train for shifting said clutch including a plate interconnected for rotation by the train, a pair of trip plungers carried by the table, means on the plate for actuating said plungers, and means operatively interconnecting the plungers for shifting the clutch.

18. In a milling machine having a cutter and a table movable transversely of the cutter, the combination with a feed transmission terminating in a clutch having a neutral position and a power transmitting position on either side thereof, of an attachment mounted on the table, a train extending from said clutch to the attachment, and means operable by said train for shifting said clutch including a plate interconnected for rotation by the train, a pair of trip plungers carried by the table, a dog on the plate having a first part selectively positionable for cooperation with one plunger, and a second part selectively positionable for cooperation with the second plunger, means operatively connecting one plunger for shifting the clutch out of one power transmitting position, and means operatively connecting the second plunger for shifting the clutch out of the other power transmitting position.

19. In a milling machine the combination with a table and an attachment carried thereby, of a driver for the attachment, a power transmission for effecting movement of the table and driver including a common control clutch, means for operating said clutch from the attachment including a slidable dog rail carried by the table, trip dogs mounted on the rail for shifting said clutch, and means interconnecting said rail for trip movement by the attachment driver at a faster rate than the rate of movement of the table.

20. In a spiral milling machine having a rotatable cutter, the combination of transmission mechanism for simultaneously effecting a bodily and rotative movement of a work piece relative to the cutter, means to adjust said mechanism to vary the rate of resultant movement between the cutter and work piece, and indicator means operatively associated with said mechanism adjusting means by which the resultant feed rate between the cutter and work may be determined.

21. In a spiral milling machine having a rotatable cutter, the combination of a transmission mechanism for imparting a simultaneous, longitudinal, and rotative movement to a work piece relative to the cutter to effect thereby a non-rectilinear cutting path, means to adjust said mechanism to vary the rate of movement in said path and dial means operatively associated with said mechanism adjusting means from which the rate of feeding movement along said path may be determined.

22. In a milling machine having a rotatable cutter and a work support, the combination with a variable feed mechanism having a rate dial associated therewith, of an attachment mechanism carried by the work support and connectible for utilization of the output of said feed mechanism to effect a simultaneous traverse and rotation of the work relative to the cutter and thereby a resultant spiral movement of given lead, and a second dial means positionable in accordance with said lead for yielding a reading multipliable by the reading of the first dial to give the rate of feeding movement along said spiral path.

23. In a milling machine for cutting spirals and the like, the combination with a rotatable cutter and work table, of a variable feed transmission, a rate change mechanism associated therewith having a relatively movable dial and pointer for indicating the setting of said transmission, an additional transmission serially connectible with the feed transmission having means for effecting a spiral movement of a work piece carried by the table relative to the cutter, means in said additional transmission for varying the effect of the first transmission, a second relatively movable dial and pointer associated with said means whereby the product of the indicated readings of both dials will yield the feed rate of the spiral movement.

24. In a machine tool transmission the combination of a first variable feed mechanism, rate change means associated therewith, a second variable speed transmission serially connected with the first, independent means adjustable to vary the output of the second transmission, a relatively movable dial and pointer associated with the rate change means of the first transmission, an additional dial and pointer associated with the adjusting means of the second transmission whereby the product of the indicated readings of the two dials will yield the resultant rate of relative movement of the work with respect to the cutter.

25. In a milling machine the combination of a tool spindle, a work spindle, an actuator for effecting relative bodily movement between said spindles, a second actuator for effecting a relative rotative movement between said spindles, a power train, motion transmitting connections for coupling the train to the actuators including an oppositely rotatable sleeve mounted coaxially of the first actuator, independent means adjacent one end of the sleeve for coupling the respective actuators to the sleeve, and means to prevent coupling of more than one of said actuators to the sleeve at one time.

26. In a milling machine the combination of a tool spindle, a work spindle, an actuator for effecting relative bodily movement between said spindles, a second actuator for effecting a relative rotative movement between said spindles, a second actuator for effecting a relative rotative movement between said spindles, a power train, a member mounted coaxially of one of said actuators and operatively connectible for rotation by the train in opposite directions, a separate means adjacent one end of the member for coupling the actuators respectively thereto, said separate means including a rotatable member having a splined bore for inter-connection with one of said actuators, and a second rotatable member having means thereon for selective inter-connection with the other actuator.

27. In a milling machine having a tool spindle and a work spindle, the combination of a transmission including a rotator for effecting a first relative movement between the spindles, an actuator for effecting a relative bodily movement between the spindles, means for imparting proportional rates of movement to the rotator and actuator including a power train, a pair of members driven thereby, means connecting the members respectively to the actuator and rotator for simultaneous effectuation of both members and thereby establishment of a spiral cutting path, differential gearing coupling the train to said members, and means effective on the gearing to constrain the rates of member rotation to prescribed ratios and thereby determine the pitch of said spiral path.

28. In a milling machine having a tool spindle and a work spindle, the combination of a transmission including a rotator for effecting a first relative movement between the spindles, an actuator for effecting a relative bodily movement between the spindles, means for imparting proportional rates of movement to the rotator and actuator including a power train, a pair of members driven thereby, means connecting the members respectively to the actuator and rotator for simultaneous effectuation of both members and thereby establishment of a spiral cutting path, differential gearing coupling the train to said members, means effective on the gearing to constrain the rates of member rotation to prescribed ratios and thereby determine the pitch of said spiral path, and a reverser in the power train for simultaneously changing the direction of rotation of the members to thereby change the hand of the spiral path.

29. In a milling machine having a tool spindle and a work spindle, the combination of a transmission including a rotator for effecting a first relative movement between the spindles, an actuator for effecting a relative bodily movement between the spindles, means for imparting proportional rates of movement to the rotator and actuator including a power train, a pair of members driven thereby, means connecting the members respectively to the actuator and rotator for simultaneous effectuation of both members and thereby establishment of a spiral cutting path, differential gearing coupling the train to said members, means effective on the gearing to constrain the rates of member rotation to prescribed ratios and thereby determine the pitch of said spiral path, and rate change gearing in the power train for varying the feed rate along the spiral path.

30. In a milling machine having a tool spindle and a work spindle, the combination of a transmission including a rotator for effecting a first relative movement between the spindles, an actuator for effecting a relative bodily movement between the spindles, means for imparting proportional rates of movement to the rotator and actuator including a power train, a pair of members driven thereby, means connecting the members respectively to the actuator and rotator for simultaneous effectuation of both members and thereby establishment of a spiral cutting path, differential gearing coupling the train to said members, means effective on the gearing to constrain the rates of member rotation to prescribed ratios and thereby determine the pitch of said spiral path, and means to actuate said train selectively at a plurality of feed rates to vary the rate of cutting along said spiral path or at a quick traverse rate for return movement along said path.

31. In a milling machine having a tool spindle and a work spindle, the combination of a transmission including a rotator for effecting a first relative movement between the spindles, an actuator for effecting a relative bodily movement between the spindles, means for imparting proportional rates of movement to the rotator and actuator including a power train, a pair of members driven thereby, means connecting the members respectively to the actuator and rotator for simultaneous effectuation of both members and thereby establishment of a spiral cutting path, differential gearing coupling the train to said members, means effective on the gearing to constrain the rates of member rotation to prescribed ratios and thereby determine the pitch of said spiral path, means to actuate said train at a plurality of relatively slow rates to vary the rate of cutting along said spiral path, and power operable means to effect a bodily separation between said spindles at the termination of the cutting action.

32. In a machine tool the combination of a transmission for effecting simultaneous movement of two members at different rates, control means for said transmission including a trip operable part for simultaneously terminating movement of the members, and means selectively positionable for tripping said part from either of said moving members.

33. In a machine tool having a support, a slide movable on said support, and transmission means for power movement of the slide, the combination of a trip operable part carried by the support for changing the effect of said transmission, a trip member carried by the slide for cooperation with said part, and means to move said member at a different rate from the rate of movement of the slide for tripping said part.

ERWIN G. ROEHM.